United States Patent [19]
Cornelius

[11] 3,951,379
[45] Apr. 20, 1976

[54] FLOW CONTROL DEVICE

[75] Inventor: Gail Cornelius, Portland, Oreg.

[73] Assignee: R. M. Wade & Co., Portland, Oreg.

[22] Filed: June 21, 1974

[21] Appl. No.: 481,893

[52] U.S. Cl. .............................. 251/118; 137/540; 138/45
[51] Int. Cl.² .................. F16K 15/06; F16K 47/00
[58] Field of Search ............ 251/118; 137/437, 540; 138/45

[56] References Cited
UNITED STATES PATENTS

| | | | |
|---|---|---|---|
| 2,454,929 | 11/1948 | Kempton | 138/45 |
| 3,105,477 | 10/1963 | Lowther | 138/45 X |
| 3,192,949 | 7/1965 | DeSee | 137/540 |
| 3,799,132 | 3/1974 | MacGuire | 138/45 X |

Primary Examiner—Henry T. Klinksiek
Attorney, Agent, or Firm—Phillips, Moore, Weissenberger, Lempio & Strabala

[57] ABSTRACT

A flow control device includes a resilient member defining an opening through which fluid flows, the opening becoming smaller upon increase of pressure of fluid supplied thereto, and relatively larger upon decrease of pressure of fluid supplied thereto. A check valve allows flow of such fluid in an irrigating direction through the device upon a certain level of pressure of supplied water being achieved, but closes when such pressure falls below such certain level to block flow through the device.

4 Claims, 2 Drawing Figures

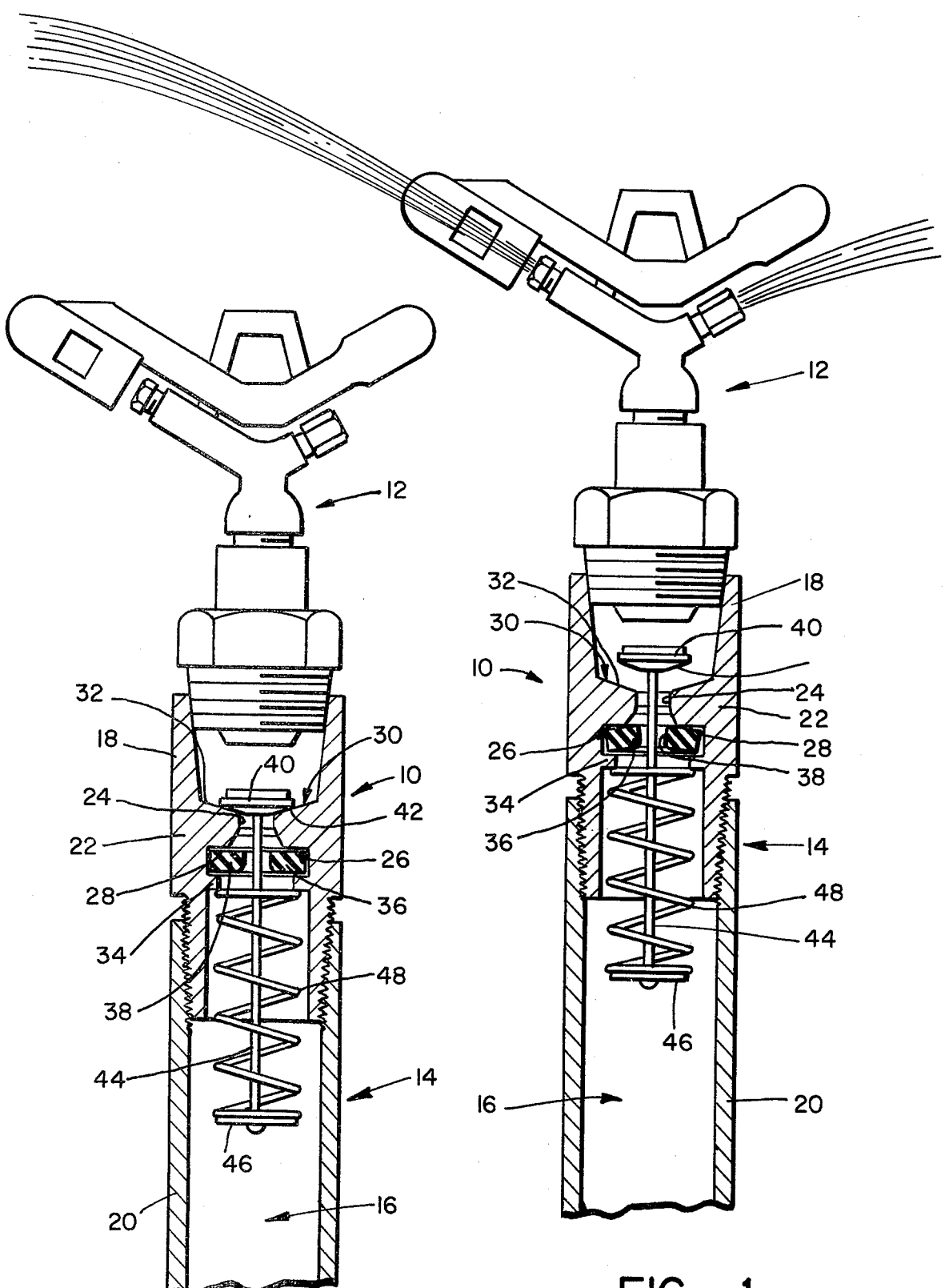
FIG_2
FIG_1

FLOW CONTROL DEVICE

BACKGROUND OF THE INVENTION

This invention relates to fluid flow control devices, and more particularly, to such a device which limits draining of fluid back through the device.

In various applications of irrigation systems, it has been found quite advantageous to provide a device which insures a substantially constant water flow therethrough, even though the pressure of the water being delivered to the device may vary. Devices for providing such operation are generally disclosed in U.S. Pat. No. 2,389,134 to Brown, and U.S. Pat. No. 2,454,929 to Kempton. Such a device may be used with particular advantage in the lowest-positioned sprinkler of an irrigation system including a number of sprinklers. This is so because the pressure head applied to this lowermost sprinkler results in increased flow-inducing pressure being applied to such lowermost sprinkler, as compared to the sprinklers elevationally above it.

While such systems are quite advantageous in use, it will be understood that, when they are used in accordance with the teaching of such patents and in combination with, for example, a sprinkler irrigation system, certain problems exist. For example, when a system incorporating such devices is shut off, such devices allow water to drain off from such sprinkler nozzle at the lowest elevation of the system. If in fact the sprinkler is lower than the rest of the system, eventually all of the water will drain from the system. Such drainage is a serious problem in that the draining water causes erosion of the soil and damage to crops. Additionally, if the sprinkler system completely drains, aluminum tubing in the system is subject to a greater expansion and contraction from temperature differences than would be the case if such tubing was filled with water. It has been found that with empty aluminum tubing, the expansion and contraction may be enough to cause couplers connecting portions of the tubing to become unlatched. Furthermore, on many large systems, it is quite expensive to continually refill the drained system with water.

SUMMARY OF THE INVENTION

It is accordingly an object of this invention to provide a flow control device which provides substantially constant flow of fluid therethrough, even though the pressure of the fluid supplied thereto may vary.

It is a further object of this invention to provide a flow control device which, while fulfilling the above object, limits drainage of the fluid in a system back through such device.

It is a still further object of this invention to provice a flow control device which, while fulfilling the above objects, is extremely simple in construction and effective in use.

Broadly stated, the invention comprises a flow control device comprising a body defining a passage through which fluid may flow upon application of fluid pressure thereto. Means are provided within the passage defined by the body and are supported relative thereto, and define an opening through which the fluid may flow in the passage. Such means are responsive to relatively increased fluid pressure causing the fluid flow to decrease the cross-sectional area of the opening through which the fluid may flow. Such means are further responsive to relatively decreased fluid pressure causing fluid flow to increase the cross-sectional area of the opening through which fluid may flow. Means are associated with the body for allowing fluid flow through the passage upon application of fluid pressure thereto above a certain level, but substantially blocking fluid flow upon decrease of applied fluid pressure to below said certain level.

BRIEF DESCRIPTION OF THE DRAWINGS

These and other objects of the invention will become apparent from a study of the following specification and drawings, in which:

FIG. 1 is a sectional elevation of the device associated with a sprinkler head and with water flowing through the device; and FIG. 2 is a view similar to FIG. 1, but showing the device in position to limit drainage therethrough.

DESCRIPTION OF THE PREFERRED EMBODIMENT

Shown in FIGS. 1 and 2 is a flow control device 10 in combination with a sprinkler head 12. Water under pressure is supplied to the device 10 from the lower end thereof, traveling therethrough and exiting from the sprinkler head 12 in a well-known manner. The device 10 includes a body 14 defining a passage 16. The body 14 is made up of a body portion 18 and a body portion 20 threadably connected thereto, the sprinkler head 12 being threadably connected to the upper end of the body portion 18.

Body portion 18 defines an inwardly disposed annular shoulder 22 which defines an inner circular passage portion 24. The lower side 26 of the shoulder 22 defines a surface 28 which is substantially radial in configuration, and the upper side 30 of the shoulder 22 defines a surface 32 which is tapered downwardly inwardly in the direction of the passage portion 24. The body portion 18 also defines an inwardly disposed annular rib 34, and an annular resilient member 36 is disposed between the radial surface 28 of the shoulder 22 and the rib 34 to be supported relative to the body portion 18, such resilient member 36 being clearly shown as positioned on the lower side 26 of the shoulder 22.

The resilient member 36 defines a central opening 38 therethrough.

A valving element 40 is disposed on the upper side 30 of the shoulder 22 adjacent the surface 32, and includes a downwardly inwardly tapered lower surface portion 42 configured to engage with and be seatable and positionable against a portion of the upper side 30 of the shoulder 22.

An elongated rod member 44 is fixed to the valving element 40 and extends through the inner passage portion 24, through the opening 38 defined by the resilient member 36, and therebeyond. A flat end member 46 is fixed to the extended end of the rod 44, and helical spring 48 is disposed about the rod 44 and between the end member 46 and rib 34 for resiliently urging the biasing the valving element 40 into a position against the portion of the annular shoulder 22.

In the use of the device 10, reference is made to FIG. 1, wherein water under pressure is supplied to the body portion 20 from the lower end thereof, to travel through the opening 38 defined by the resilient member 36. Upon the supplied pressure reaching a chosen certain level, and rising thereabove, the valving element 40 is urged away from the shoulder 22 against the force of the helical spring 48. The spring rate of the helical spring 48 is chosen in this embodiment so that the valving element 40 is moved away from the shoulder 22 upon application of approximately 22 psi pressure thereto. Such water is thereby allowed to flow into the sprinkler head 12, from which it exits in a conventional manner. Upon a relative increase in water pressure supplied to the device 10, such increased pressure acts on the lower side of the resilient member 36 to force it against the side 26 of the shoulder 22 and distort and press such resilient member 36 to in turn decrease the cross-sectional area of the opening 38, the inner annular edge of the lower side 26 of the shoulder being sized in relation to the sizing of the resilient member 36 to promote such deformation. Likewise, upon supply of relatively decreased water pressure to cause such flow, the resilient member 36 returns to an extent to its generally original shape, increasing the cross-sectional area of the opening 38. Through such means, even though the pressure of the water supplied to the device 10 to flow into the sprinkler head 12 may vary, the flow through the device 10 is maintained at a substantially constant rate.

During the just-described operation, the valving element 40 is lifted away from the shoulder 22 against the resilience of the helical spring 48, and the normal irrigation water pressure supplied is approximately 40 psi.

Upon a decrease in the supply of water pressure to the device 10 to a level of 22 psi, the valving element 40 seats against the shoulder 22, blocking fluid flow through the device 10. Upon such seating of the valving element 40 against the shoulder portion, it is insured that water which is still within the system and above the exit points of the nozzle 12 will be blocked from flowing from such elevated area into the body portion 20, and upwardly through the device 10 and from such exit points of the sprinkler nozzle 16. This is so because the pressure head of such elevated water is not sufficient to itself lift the valving element 40 away from the shoulder 22, because of the particular choice above which sets forth that a substantial pressure (in this embodiment 22 psi) must be necessarily applied to such valving element 40 to overcome the force of the helical spring 48.

Such limitation of draining overcomes the problems set forth above.

What is claimed is:

1. A flow control device comprising:
   a body defining a passage through which fluid may flow upon application of fluid pressure thereto
   means within the passage defined by the body and supported relative thereto, and defining an opening through which the fluid may flow within the passage, and responsive to relatively increased fluid pressure causing said fluid flow to decrease the cross-sectional area of the opening through which said fluid may flow, and responsive to relatively decreased fluid pressure causing fluid flow to increase the cross-sectional area of the opening through which said fluid may flow; and
   means connected to said body for allowing fluid flow through the passage upon application of fluid pressure thereto above a certain positive level, but blocking fluid flow upon decrease of applied fluid pressure to below said certain positive level.

2. The device of claim 1 wherein the body defines an inwardly disposed annular shoulder defining an inner passage portion, the means within the passage and supported relative thereto comprising a resilient annular member defining said opening and positioned on one side of the shoulder and forced thereagainst by fluid pressure causing fluid flow, the means associated with said body for allowing fluid flow and blocking fluid flow comprising a valving element positionable against a portion of said annular shoulder on the other side thereof to block said inner passage portion, and movable away from said shoulder to allow fluid flow through said inner passage portion.

3. The device of claim 2 wherein the body defines an inwardly disposed annular rib, the resilient member being disposed between the shoulder and rib to be supported relative to the body.

4. The device of claim 3 and further comprising an elongated member fixed to the valving element and extending through the inner passage portion, and through the opening defined by the resilient member and therebeyond, and an end member fixed to the extended end of the elongated member, and helical spring means disposed about the elongated member and between the end member and rib for resiliently urging and biasing the valving element into a position against said portion of the annular shoulder.

* * * * *